(12) United States Patent
Frierman

(10) Patent No.: US 7,810,589 B2
(45) Date of Patent: Oct. 12, 2010

(54) KINETIC ENERGY VEHICLE

(76) Inventor: Edward Michael Frierman, 5453 Houston Dr., Lakeland, FL (US) 33809

( * ) Notice: Subject to any disclaimer, the term of this patent is extended or adjusted under 35 U.S.C. 154(b) by 0 days.

(21) Appl. No.: 12/315,822

(22) Filed: Dec. 5, 2008

(65) Prior Publication Data

US 2010/0140006 A1    Jun. 10, 2010

(51) Int. Cl.
*B60K 1/00* (2006.01)
(52) U.S. Cl. .................. 180/2.2; 180/2.1; 180/65.1
(58) Field of Classification Search .............. 180/2.1, 180/2.2
See application file for complete search history.

(56) References Cited

U.S. PATENT DOCUMENTS

| | | | | |
|---|---|---|---|---|
| 3,513,326 A * | 5/1970 | Potts | .................. | 290/55 |
| 4,075,545 A * | 2/1978 | Haberer | .................. | 322/35 |
| 4,093,035 A * | 6/1978 | Fletcher | .................. | 180/2.2 |
| 4,168,759 A * | 9/1979 | Hull et al. | .................. | 180/2.2 |
| 4,423,368 A * | 12/1983 | Bussiere | .................. | 322/35 |
| 4,632,205 A * | 12/1986 | Lewis | .................. | 180/165 |
| 5,280,827 A * | 1/1994 | Taylor et al. | .................. | 180/165 |
| 5,287,004 A * | 2/1994 | Finley | .................. | 290/55 |
| 5,680,032 A * | 10/1997 | Pena | .................. | 290/52 |
| 6,138,781 A * | 10/2000 | Hakala | .................. | 180/2.2 |
| 2008/0048457 A1* | 2/2008 | Patel et al. | .................. | 290/1 R |

* cited by examiner

*Primary Examiner*—Paul N Dickson
*Assistant Examiner*—Katy Meyer

(57) ABSTRACT

A main body portion has a front, a rear, a top, a bottom and laterally spaced sides and an air intake. A housing in the vehicle contains a turbine/flywheel adapted to be rotated in response to air entering the housing from the air intake. A starter generator in the housing is adapted to be rotated by the rotation of the turbine/flywheel. A main drive generator in the housing is adapted to be rotated by the rotation of the turbine/flywheel. An electric drive motor in the vehicle is powered from the main drive generator.

3 Claims, 5 Drawing Sheets

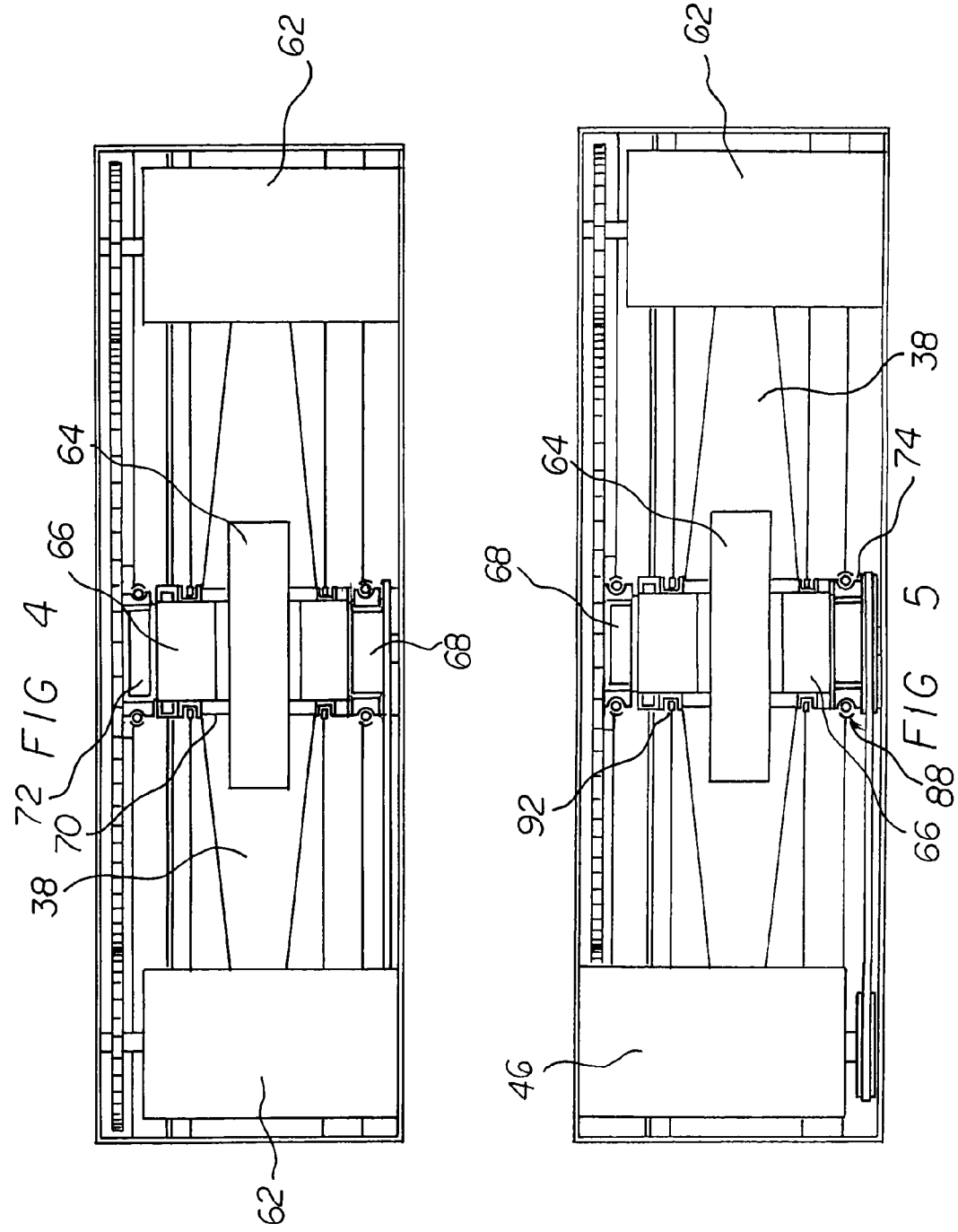

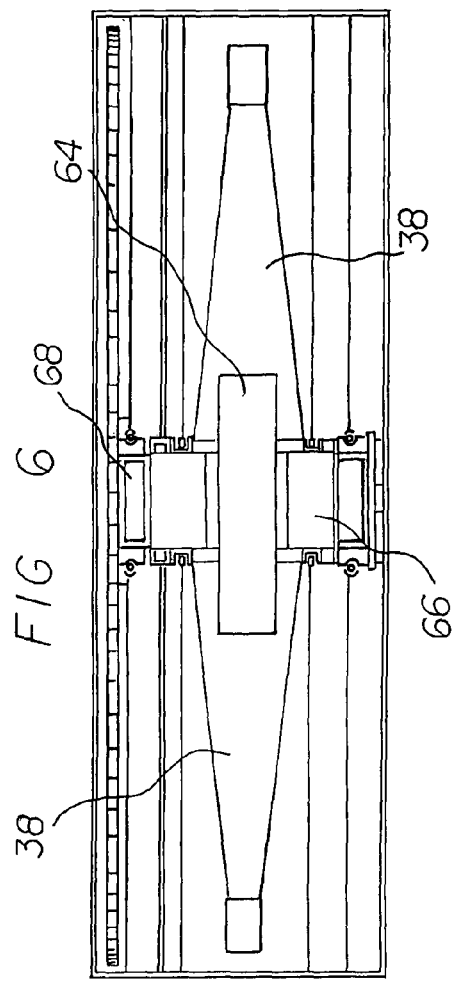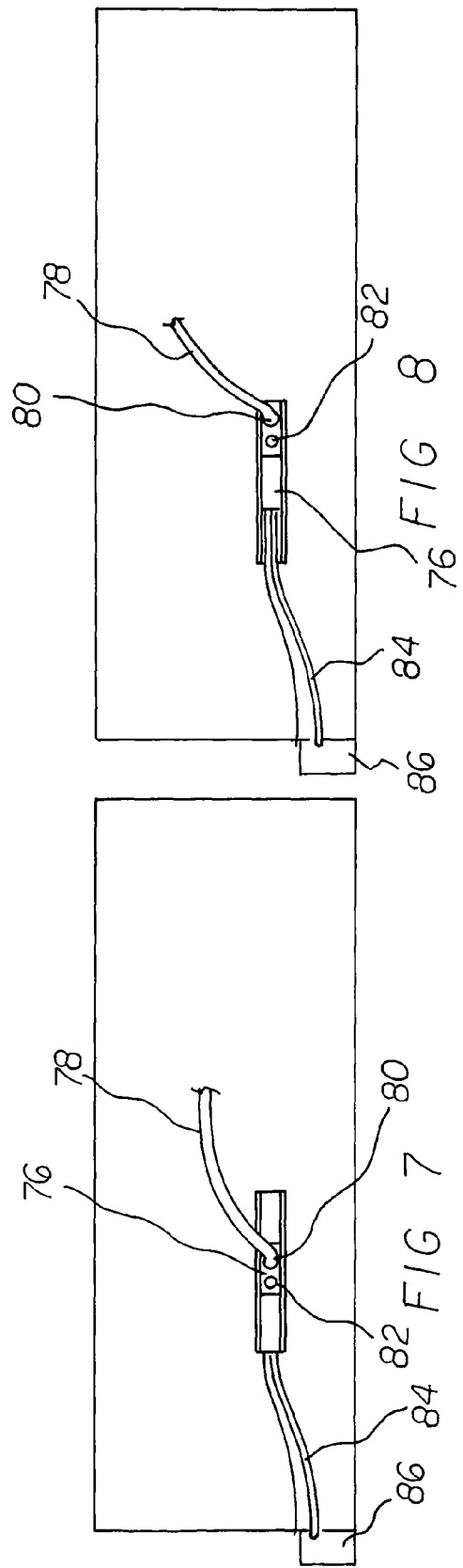

FIG 9
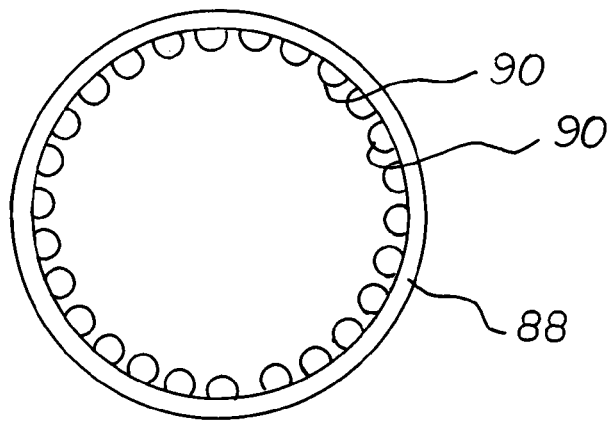
FIG 10
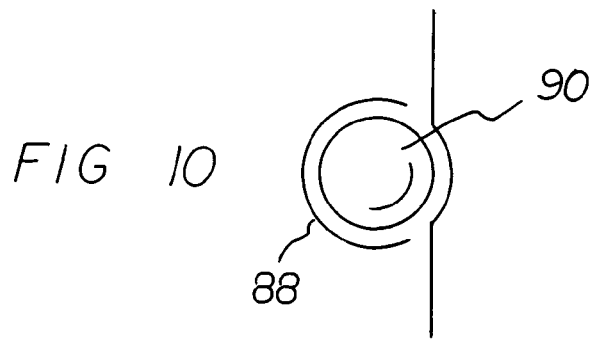
FIG 11
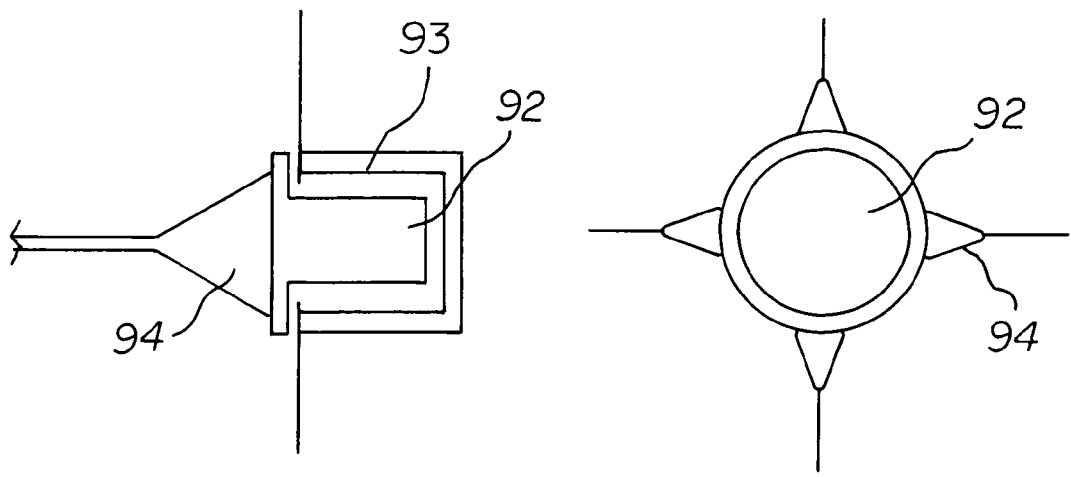
FIG 12

FIG 13
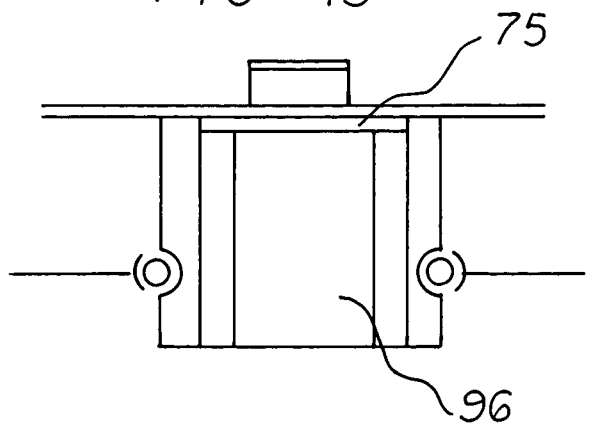
FIG 14
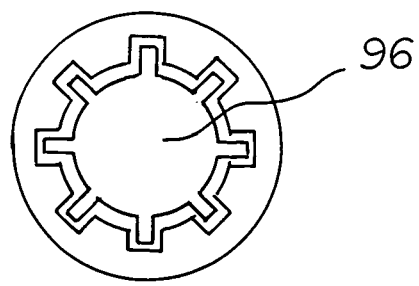
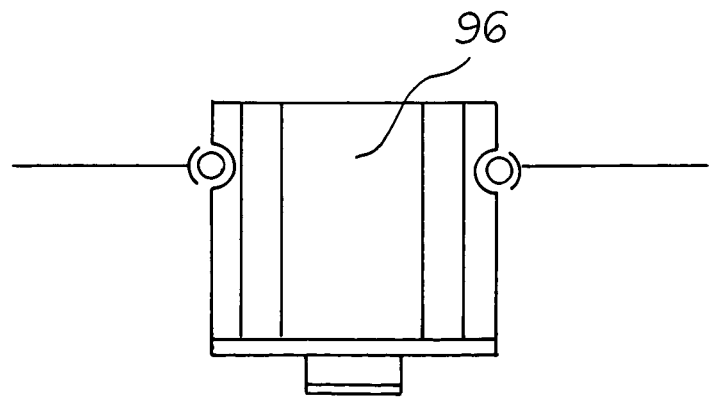
FIG 15

KINETIC ENERGY VEHICLE

BACKGROUND OF THE INVENTION

1. Field of the Invention

The present invention relates to a kinetic energy vehicle and more particularly pertains to utilizing wind to counter rotate turbines in a vehicle when moving for powering the vehicle in a safe, energy efficient, economical and ecological manner.

2. Description of the Prior Art

The use of kinetic energy vehicles of known designs and configurations is known in the prior art. More specifically, kinetic energy vehicles of known designs and configurations previously devised and utilized for the purpose of efficiently powering vehicles are known to consist basically of familiar, expected, and obvious structural configurations, notwithstanding the myriad of designs encompassed by the crowded prior art which has been developed for the fulfillment of countless objectives and requirements.

While prior art devices fulfill their respective, particular objectives and requirements, they do not describe a kinetic energy vehicle that allows for utilizing wind to counter rotate turbines in a vehicle when moving for powering the vehicle in a safe, energy efficient, economical and ecological manner.

In this respect, the kinetic energy vehicle according to the present invention substantially departs from the conventional concepts and designs of the prior art, and in doing so provides an apparatus primarily developed for the purpose of utilizing wind to counter rotate turbines in a vehicle when moving for powering the vehicle in a safe, energy efficient, economical and ecological manner.

Therefore, it can be appreciated that there exists a continuing need for a new and improved kinetic energy vehicle which can be used for utilizing wind to counter rotate turbines in a vehicle when moving for powering the vehicle in a safe, energy efficient, economical and ecological manner. In this regard, the present invention substantially fulfills this need.

SUMMARY OF THE INVENTION

In view of the foregoing disadvantages inherent in the known types of kinetic energy vehicles of known designs and configurations now present in the prior art, the present invention provides an improved kinetic energy vehicle. As such, the general purpose of the present invention, which will be described subsequently in greater detail, is to provide a new and improved kinetic energy vehicle and method which has all the advantages of the prior art and none of the disadvantages.

To attain this, the present invention essentially comprises a main body portion having a front and a rear, a top and a bottom and laterally spaced sides. The main body portion also has a lower air intake and an upper air intake.

Next provided are a forward housing and a rearward housing. The housings are located in the vehicle adjacent to the bottom. The forward housing contains a forward turbine/flywheel rotatable about a vertical axis. The rearward housing contains a rearward turbine/flywheel rotatable about a vertical axis. Turbine veins on each turbine/flywheel are adapted to be rotated in response to air entering the housings from the air intakes in response to movement of the vehicle. The lower air intake is adapted to feed air rearwardly into the first housing for rotating the first turbine/flywheel in a clockwise direction. The upper air intake is adapted to feed air rearwardly across the top of the vehicle and then forwardly into the second housing for rotating the second turbine/flywheel in a counter-clockwise direction.

Next provided is an air discharge port in each housing. Each air discharge portion has an associated air lock. An air pump is provided for each air lock. An associated air line coupling each air pump to its associated air lock. Each pump is adapted to selectively move an air lock to close its associate air port to retain a vacuum in its associated housing. Each pump is adapted to move an air lock to open its associated air port to relieve the vacuum and cause a flow of air from a housing for thereby initiating rotation of an associated turbine/flywheel.

Next provided is a central battery in each housing. Each central battery provides the electricity to activate the electromagnets, also enclosed within the housing, which in turn engages and disengages the generators providing electric current to the motor.

Next provided is a starter generator in each housing. The starter generator is adapted to be rotated by the rotation of the turbine/flywheel. A plurality of main drive generators 62 in each housing are adapted to be rotated by the rotation of the turbine/flywheel.

Lastly, an electric drive motor is provided in the vehicle for providing motor power to the vehicle. The electric drive motor is powered from the main drive generators.

As to the manner of usage and operation of the present invention, the same should be apparent from the above description. Accordingly, no further discussion relating to the manner of usage and operation will be provided.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved kinetic energy vehicle which has all of the advantages of the prior art kinetic energy vehicles of known designs and configurations and none of the disadvantages.

It is another object of the present invention to provide a new and improved kinetic energy vehicle which may be easily and efficiently manufactured and marketed.

It is further object of the present invention to provide a new and improved kinetic energy vehicle which is of durable and reliable constructions.

An even further object of the present invention is to provide a new and improved kinetic energy vehicle which is susceptible of a low cost of manufacture with regard to both materials and labor, and which accordingly is then susceptible of low prices of sale to the consuming public, thereby making such kinetic energy vehicle economically available to the buying public.

Even still another object of the present invention is to provide a kinetic energy vehicle for utilizing wind to counter rotate turbines in a vehicle when moving for powering the vehicle in a safe, energy efficient, economical and ecological manner.

Lastly, it is an object of the present invention to provide a new and improved kinetic energy vehicle having a main body portion with a front, a rear, a top, a bottom and laterally spaced sides and an air intake. A housing in the vehicle contains a turbine/flywheel adapted to be rotated in response to air entering the housing from the air intake. A starter generator in the housing is adapted to be rotated by the rotation of the turbine/flywheel. A main drive generator in the housing is adapted to be rotated by the rotation of the turbine/flywheel. An electric drive motor in the vehicle is powered from the main drive generator.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a side view showing the starter generator and one of the drive generators and a cross section through the turbine/flywheel.

FIG. 5 is a front view of the turbine/flywheel looking from the front of the car showing two of the three drive generators and a cross section through the turbine/flywheel.

FIG. 6 is a side view cross section through the turbine/flywheel without the generators.

FIG. 7 is an illustration of the air lock mechanism for the turbine/flywheel, the air lock being illustrated in a closed position.

FIG. 8 is an illustration of the air lock mechanism for the turbine/flywheel, the air lock being illustrated in an open position.

FIG. 9 is a front elevational view of the ball bearing ring.

FIG. 10 is an enlarged front elevational view of a portion of the ball bearing ring.

FIG. 11 is a cross sectional view through the spindle of the electromagnetic ring that holds the turbine/flywheel in place.

FIG. 12 is a top view through the magnetic ring that holds the turbine/flywheel in place.

FIG. 13 is a plan view of the drive generator spindle of the magnetic linkage system which couples the turbine/generator to the starter generator and the drive generators.

FIG. 14 is a cross sectional view through the spindle of the magnetic linkage system.

FIG. 15 is a plan view of the starter generator spindle of the magnetic linkage system.

The same reference numerals refer to the same parts throughout the various Figures.

DESCRIPTION OF THE PREFERRED EMBODIMENT

Figure 1:
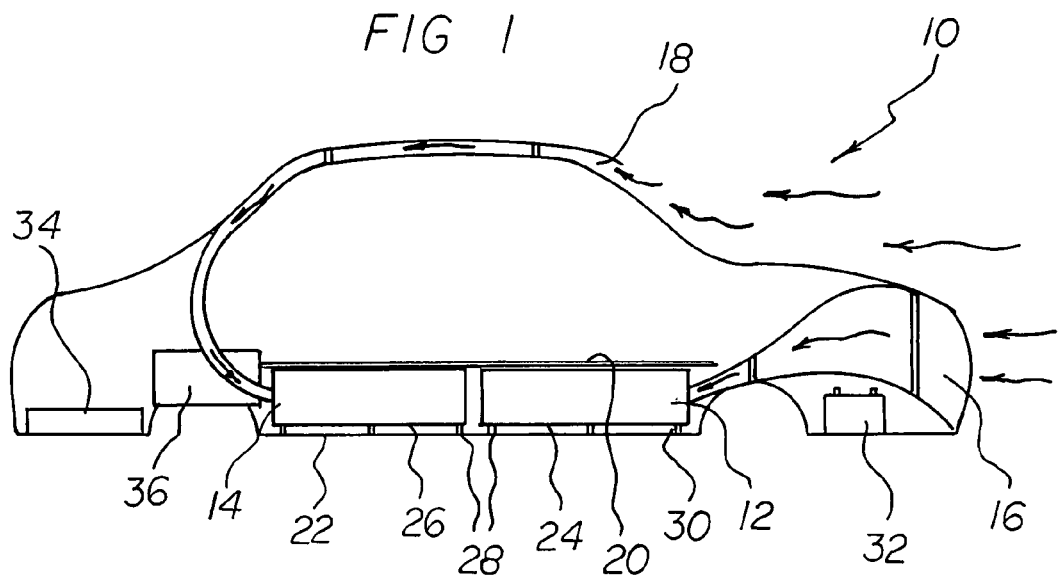
FIG. 1 is a side elevational view of a vehicle showing the location of the turbines and the air flows through the vehicle to the turbines.

With reference now to the drawings, and in particular to FIG. 1 thereof, the preferred embodiment of the new and improved kinetic energy vehicle embodying the principles and concepts of the present invention and generally designated by the reference numeral 10 will be described.

The present invention, the kinetic energy vehicle 10 is comprised of a plurality of components. Such components in their broadest context include a main body portion, a housing in the vehicle containing a turbine/flywheel, a starter generator in the housing, a main drive generator, and an electric drive motor. Such components are individually configured and correlated with respect to each other so as to attain the desired objective.

FIG. 1 is a side elevational view of a vehicle 10 showing the location of the turbines 12, 14 and the air flows through the vehicle to the turbines. The vehicle has a front lower intake 16 with a lower air duct for the clockwise turning of a forward turbine 12 and a front upper intake 18 with an upper air duct for the counterclockwise turning of a rearward turbine 14. A louvered panel and a first stage air filter followed by a secondary filter is in the lower air duct. A front filter followed by a secondary filter is in the upper air duct. A floorboard 20 is above the turbines and a turbine support 22 is beneath the turbines. Forward and rearward housings 24, 26 contains the turbines and other operational components of the system. An air pump 28 is positioned in an intermediate region of the floor board to evacuate air from the chamber and create a vacuum. A debris and water discharge port 30 are positioned at a forward region of the floorboard. A forward battery pack consisting of multiple batteries 32 is provided forwardly of the turbines. A heater 34 is provided at the rear of the vehicle. A main electric drive motor 36 with a gear box is provided between the turbines and the heater.

Figure 2:
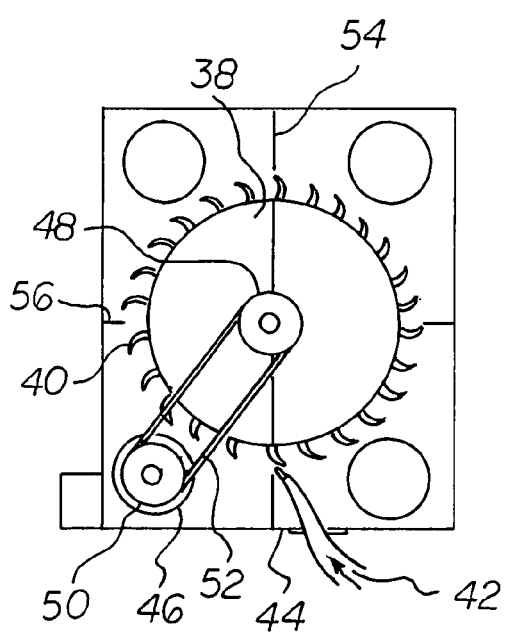
FIG. 2 is a bottom-view section of the turbine/flywheel with the front of the vehicle to the right and the side of the vehicle below.

FIG. 2 is a bottom view section of the turbine/flywheel 38 with the front of the vehicle to the right and the side of the vehicle below. Illustrated is the flywheel 12 with turbine vanes 40 driven through air an air duct with an air intake opening 42 terminating at an adjustable air nozzle adjacent to the vanes. An air exhaust opening 44 is located adjacent to the air duct. The air exhaust is shown in the open position. A starter generator 46 is coaxial with the flywheel, both mounted for rotation on ball bearing rings. Pulleys 48, 50 are mounted for rotation with the flywheel and starter generator. A pulley belt 52 couples the pulleys whereby the starter generator is adapted to initiate rotation of the turbine 12. Ring supports 54, 56 hold the ball bearing ring and the electromagnetic ring in position with respect to the housing.

Figure 3:
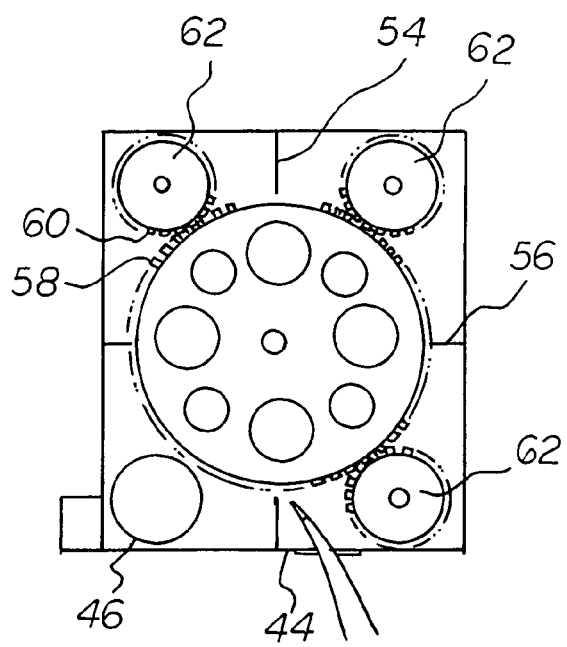
FIG. 3 is a top view section of the turbine/flywheel with the side of the vehicle below.

FIG. 3 is a top view section of the turbine/flywheel with the side of the vehicle below. This view includes the components of FIG. 2 and adds the teeth 58 of the flywheel coupling with the teeth 60 of the generator drive gears.

FIG. 4 is a side view showing the starter generator and one of the main drive generators 62 and a cross section through the turbine/flywheel. Between the generators are the central battery 64 surrounded by the electromagnet 66 and sliding steel core 68. The fly wheel 38 extends laterally from adjacent to the battery. Rotation of the various components is facilitated through the flywheel spindle 70, the main drive spindle 72, FIG. 4, and the starter spindle 74, FIG. 5.

FIG. 5 is a front view of the turbine/flywheel 38 looking from the front of the car showing two of the three main drive generators 62 and a cross section through the turbine/flywheel 38. The Figure includes essentially the same components as shown in FIG. 4 except it includes two generators 64 and not the one adjacent main generator and starter generator 46.

FIG. 6 is a side view cross section through the turbine/flywheel without the generators. More clearly seen is the electrical contact 74, FIG. 5, to the generator that supplies energy from the generators to recharge the battery inside the flywheel when the turbine is producing electricity. Also more clearly seen is the weak permanent magnet 75 that retracts the sliding steel core when the engine is shut off.

FIG. 7 is an illustration of the air lock mechanism for the turbine/flywheel, the air lock 76 being illustrated in a closed position. The air intake duct 78 terminates at the air intake opening 80 there adjacent is the air discharge port 82. The air lock slides in tracks for opening the air discharge port as shown and for closing the air discharge port. Note FIG. 8. An air pump hose 84 couples the air lock to the air pump 86 for sliding the air lock to open and close the air intake opening. FIG. 8 is similar to FIG. 7 but illustrates the air lock mechanism for the turbine/flywheel with the air lock being illustrated in an open position.

FIG. 9 is an enlarged front elevational view of the ball bearing ring 88, FIG. 5, within the outer ring 90. FIG. 10 is an enlarged front elevational view of a portion of the ball bearing ring. Illustrated are the outer ring in an arc of greater than 180 degrees with a recess of less than 180 degrees in the spindle that holds the ring in place. A solid lubricant coating is on the surfaces contacted by the ball bearings.

FIG. 11 is a cross sectional view through the spindle of the magnetic ring that holds the turbine/flywheel in place. The permanent magnet ring 92, FIG. 5, is held in position by its ring support 94. A recess in the spindle receives the permanent magnet ring. FIG. 12 is a top view through the magnetic ring that holds the turbine/flywheel in place. Permanent magnet 93 holds the magnetic ring suspended.

FIG. 13 is a plan view of the drive generator spindle 96 of the magnetic linkage system which couples the turbine/generator to the starter generator and the drive generators. FIG. 14 is a cross sectional view through the drive generator spindle of the magnetic linkage system. Centrally positioned is an inner core of steel with an outer ring of non-ferrous metal or composite material. A ball bearing ring and ring support 54 are provided for the outer ring. The steel core 66 slides up and down within the outer ring. Axially offset is the low strength magnet which retracts the inner ring of steel when the electromagnet is turned off. FIG. 15 is another plan view of the starter generator spindle of the magnetic linkage system.

From the above descriptive material, the invention first includes a vehicle 10 with a main body portion. The main body portion has a front and a rear, a top and a bottom and laterally spaced sides. The main body portion also has a lower air intake 16 and an upper air intake 18.

Next provided are a forward housing 24 and a rearward housing 26. The housings are located in the vehicle adjacent to the bottom. The forward housing contains a forward turbine/flywheel 38 rotatable about a vertical axis. The rearward housing contains a rearward turbine/flywheel 38 rotatable about a vertical axis. Turbine veins 40 on each turbine/flywheel are adapted to be rotated in response to air entering the housings from the air intakes in response to movement of the vehicle. The lower air intake is adapted to feed air rearwardly into the first housing for rotating the first turbine/flywheel in a clockwise direction. The upper air intake is adapted to feed air rearwardly across the top of the vehicle and then forwardly into the second housing for rotating the second turbine/flywheel in a counter-clockwise direction.

Next provided is an air discharge port 82 in each housing. Each air discharge portion has an associated air lock 76. An air pump 86 is provided for each air lock. An associated air line coupling each air pump to its associated air lock. Each pump is adapted to selectively move an air lock to close its associate air port to retain a vacuum in its associated housing. Each pump is adapted to move an air lock to open its associated air port to relieve the vacuum and cause a flow of air from a housing for thereby initiating rotation of an associated turbine/flywheel.

Next provided is a central battery 64 in each housing. The central battery in each housing provides the electricity to activate the electromagnets, also enclosed within the housing, which in turn engages and disengages the generators providing electric current to the motor.

Next provided is a starter generator 46 in each housing. The starter generator is adapted to be rotated by the rotation of the turbine/flywheel. A plurality of main drive generators 62 in each housing are adapted to be rotated by the rotation of the turbine/flywheel.

Lastly, an electric drive motor 36 is provided in the vehicle for providing motor power to the vehicle. The electric drive motor is powered from the main drive generators.

From an operational view point, the kinetic energy vehicle is an automobile or other type of vehicle that runs without combustible fuel and has no exhaust emissions. It is based on the same principle as wind turbines only in reverse. It operates by the force of air against the vehicle created by its forward movement.

The vehicle operates entirely without combustible fuel and with limited energy from batteries. Batteries are, however, used for reserve power.

The energy producing turbines are an integral part of the auto framework, thus it can be built as a conventional auto without re-configuration or loss of aesthetics. The vehicle provides a standard passenger compartment not compromised by small size or loss of safety features.

The faster the vehicle moves the more power it produces, thus it can run at highway speeds or operate in stop and go traffic.

Energy is stored in a vacuum enclosed turbine/flywheel while the vehicle is not in motion. When the vehicle starts, mechanical energy from the flywheel is transferred to a generator that provides electricity to the electric motor. Additional start-up energy is provided by batteries.

When the vehicle achieves a speed of approximately ten miles per hour the vacuum is broken and the turbine part of the turbine/flywheel is activated by air passing through the vehicle. This produces more electric power through additional generators. These generators provide all the electricity necessary for the electric motor and also recharge the batteries.

Two counter-rotating turbine/flywheels are used to prevent a gyroscopic effect that could impair steering.

When the vehicle is stopped, and the engine turned off, a pump removes the air from the turbine chamber. The turbine/flywheel then disengages from the electric generators and spins in a no-load configuration in the vacuum chamber. Load is only placed on the flywheel part of the turbine/flywheel when the engine is started; but the vacuum remains intact until the 10 mph speed is reached. At 10 mph the vacuum seal is broken and air passing through the vehicle is forced through a nozzle. That air pressure turns the turbine blades. Until 10 mph is reached air passing through the vehicle is deflected to the outside.

Air enters the vehicle through the front beneath the hood. Headlights are concealed inside this large opening. In the event of snow, rain or large amounts of debris in the air louvers recessed within the large hood opening deflect this away.

Another opening above the windshield also directs air to the turbine. In the event that rain, snow or debris is so intense, the hood louvers will close completely and the protected windshield opening supports both turbines.

To operate the vehicle, a user pushes the starter whereby a battery inside the flywheel provides electricity to an electromagnet at the base of flywheel spindle. This electromagnet engages a sliding steel core within the starter spindle that has a pulley attached. The momentum of the flywheel turns the starter spindle and through a pulley system turns the starter generator. This generator provides enough electricity with the batteries to operate the engine. All systems within the turbine/flywheel enclosure are in a vacuum until the vehicle achieves a speed of approximately ten miles per hour. Once ten mph is reached the vacuum seal is broken and air flowing through the vehicle and above the vehicle is forced through adjustable nozzles that turn the turbines. An electromagnet at the top of the flywheel spindle engages the sliding steel core within the drive spindle. The main drive gear is attached to this spindle that turns the generator gears attached to the three main drive generators. This now provides enough energy to drive a substantial electric motor and recharge the batteries.

When the engine is turned off an air pump evacuates the turbine chamber and the electromagnets in the flywheel spindle disengage from the starter spindle and the drive spindle. The flywheel then spins in a no-load configuration, being suspended by electromagnet rings. The battery inside the flywheel is recharged during driving, and provides energy to the electromagnet rings while the engine is off.

The automobile has a standard passenger compartment and conventional controls.

The starter generators provide initial electricity to the motor in conjunction with the batteries to put the vehicle in motion, but the starter generators can also be used to recharge the batteries when the engine is turned off, in the event they are not fully charged.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A kinetic energy vehicle comprising:
    a main body portion with a front and a rear, a top and a bottom and laterally spaced sides, the main body portion having two air intakes;
    a housing in the bottom of the vehicle containing two turbine/flywheels rotatable about vertical axes and adapted to be rotated in opposite directions in response to air entering the housing from the air intakes, the housing extending from adjacent to the front of the vehicle to adjacent to the rear of the vehicle;
    a starter generator in the housing adapted to be rotated by the rotation of the turbine/flywheel, a main drive generator in the housing adapted to be rotated by the rotation of the turbine/flywheel;
    an electric drive motor in the vehicle powered from the main drive generator; and
    an air discharge port in the housing with an air lock to selectively move to close the air discharge port to retain a vacuum in the housing and adapted to move to open the air discharge port to relieve the vacuum and cause a flow of air from the housing for thereby initiating rotation of the turbine/flywheels.

2. The system as set forth in claim 1 and further including:
    a battery in the housing to assist the flow of air from the housing in the initiation of the rotation of the turbine/flywheels.

3. A kinetic energy vehicle utilizing wind to counter rotate turbines in the vehicle when moving for powering the vehicle, the powering being done in a safe, energy efficient, economical and ecological manner, the vehicle comprising, in combination:
    a main body portion with a front and a rear, a top and a bottom and laterally spaced sides, the main body portion having a lower air intake and an upper air intake;
    a forward housing and a rearward housing, the housings being located in the vehicle adjacent to the bottom, the forward housing containing a forward turbine/flywheel rotatable about a vertical axis, the rearward housing containing a rearward turbine/flywheel rotatable about a vertical axis parallel with the axis of the forward turbine/flywheel, turbine veins on each turbine/flywheel adapted to be rotated in response to air entering the housings from the air intakes in response to movement of the vehicle, the lower air intake adapted to feed air rearwardly into the first housing for rotating the first turbine/flywheel in a clockwise direction, the upper air intake adapted to feed air rearwardly across the top of the vehicle and then forwardly into the second housing for rotating the second turbine/flywheel in a counter-clockwise direction;
    an air discharge port in each housing with an associated air lock, an air pump for each air lock with an associated air line coupling each air pump to its associated air lock, each pump adapted to selectively move an air lock to close its associate air port to retain a vacuum in its associated housing, each pump adapted to move an air lock to open its associated air port to relieve the vacuum and cause a flow of air from a housing for thereby initiating rotation of an associated turbine/flywheel;
    a central battery in each housing provides the electricity to activate the electromagnets also enclosed within the housing which in turn engages and disengages the generators providing electric current to the motor;
    a starter generator in each housing adapted to be rotated by the rotation of the turbine/flywheel, a plurality of main drive generators in each housing adapted to be rotated by the rotation of the turbine/flywheel; and
    an electric drive motor in the vehicle for providing motor power to the vehicle, the electric drive motor being powered from the main drive generators.

* * * * *